A. S. Southworth,
Plate-Holder for Camera,
No. 1,049. Reissued Sept. 25, 1860.
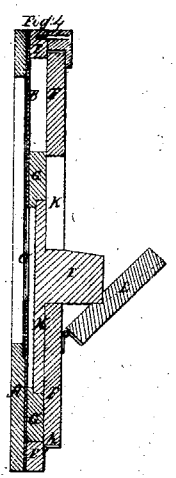
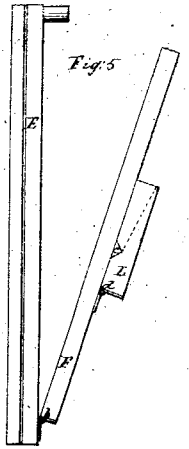
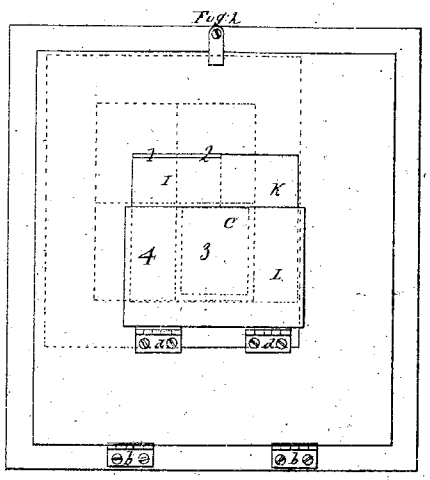
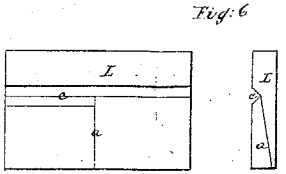
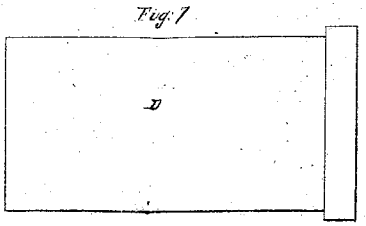
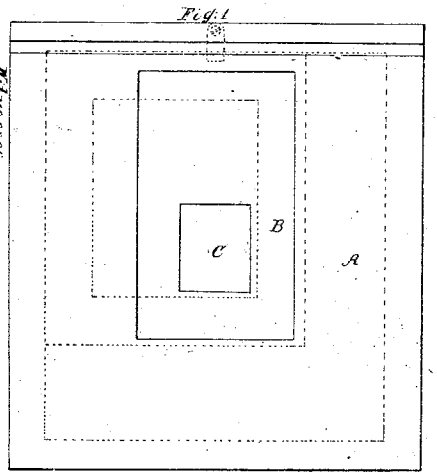
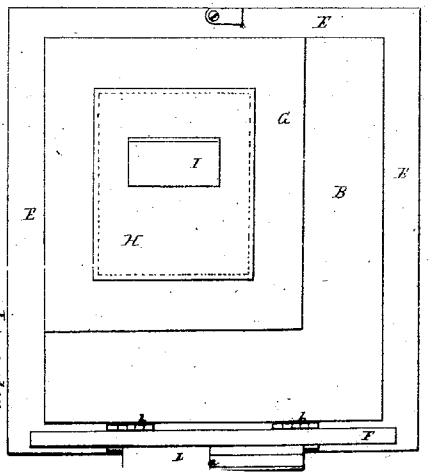
Witnesses:
A. H. Bickwell
Jacob C. Rowe
Inventor
Albert S. Southworth

UNITED STATES PATENT OFFICE.

ALBERT S. SOUTHWORTH, OF BOSTON, MASSACHUSETTS.

PLATE-HOLDER FOR CAMERAS

Specification forming part of Letters Patent No. 12,700, dated April 10, 1855; Reissue No. 1,049, dated September 25, 1860.

*To all whom it may concern:*

Be it known that I, ALBERT S. SOUTHWORTH, of Boston, in the county of Suffolk and State of Massachusetts, have invented certain improvements in taking photographic impressions, of which the following is a full, clear, and exact description, reference being had to the accompanying drawings, making part of this specification, in which—

Figure 1 is a front view of the apparatus which I employ in carrying out my invention. Fig. 2 is a rear view; Fig. 3, a similar view, the cover being dropped into a horizontal position; Fig. 4, a vertical section through the center; Fig. 5, an end view; Fig. 6, details which will be referred to hereinafter; Fig. 7, the slider.

In taking daguerreotypes, photographs, &c., it has been customary to use a separate plate for each impression, the plate being removed from the camera and replaced by another. Where several impressions of the same object were to be taken, as in multiplying copies, or for the purpose of selecting the "best-timed" picture, this caused considerable delay and trouble, to obviate which is the object of my present invention, which consists in bringing successively different portions of the same plate, or several smaller plates secured in one plate-holder, into the field of the lens of the camera.

In carrying out my invention I have made use of a peculiarly-arranged frame, in which the plate-holder is permitted to slide, and in which the position of the plate-holder is definitely indicated to the operator, so that he can quickly and accurately adjust the plate or plates, the accompanying drawings and description so explaining the same that others skilled in the art may understand and use my invention.

The frame which guides the motion of the plate-holder is constructed as follows: A is the front plate, immediately in the rear of which is a zinc plate, B. In the center of this plate is the hole C, (seen in blue in Fig. 2,) which is closed by the zinc slider D, Fig. 7, in the customary manner. Around the borders of this frame are the strips E. (Seen in section in Fig. 4 and in dotted lines in Fig. 1.) The rear plate, F, of this frame is hinged to one of the strips E at *b*. Between this plate and the zinc plate B and within the space inclosed by the strips E slides the plate-holder, which is constructed as follows: G is the frame of the plate-holder, into the rectangular opening of which is inserted the daguerreotype-plate. (Seen in red in Figs. 2 and 4, and in dotted lines in Fig. 1.) The back-plate, H, rests against the daguerreotype-plate and holds it in place.

The plate-holder thus constructed is allowed to take four different positions within its carrying-frame, so as to bring the four different portions, 1, 2, 3, and 4, Fig. 2, of the plate successively opposite to the opening C. It is guided in its motions in the following manner: I is a block attached to the back plate of the plate-holder, which projects through a rectangular opening, K, in the hinged plate F. The block I is moved in succession into the four corners of the opening K, by which means the four different portions of the daguerreotype-plate are brought opposite to the opening C. The motions of the block I are regulated by the guide L, hinged to the plate F at *d*. When this block is in the position seen in Fig. 2, the block I rests upon its top edge, and one corner of the daguerreotype-plate, 3, is opposite to the hole C. When the block I is slid to the opposite corner of the opening K, still resting upon the piece L, another portion, 4, of the daguerreotype-plate is brought opposite the opening C. The guide-piece L is then thrown back, as seen in Fig. 4, and the block I is allowed to drop into the right-hand lower corner of the opening K, the block I as it descends being guided by the edge *a*, and the portion 1 of the daguerreotype-plate is brought opposite the opening C. By another movement the block L is thrown into the left-hand corner of the opening K, the block I sliding in the channel *c*, when the portion 2 of the daguerreotype-plate is exposed to the opening C. I am thus enabled to take four impressions upon different portions of the same plate. These may be miniatures of the same person taken, as before stated, for the purpose of selecting the best for a locket; or they may be different views of the same face taken upon the same plate for the purpose of preserving them together; or they may be daguerreotypes of different persons, as different members of a family; or, lastly, stereoscopic pictures may be thus taken with a suitably-arranged camera.

It is evident that as the frame A B remains stationary the opening C when once placed in the axis of the camera, will not change, and the successive pictures will all be taken with equal correctness, and the changes are so quickly made that the aperture of the camera need not be covered from first to last unless different positions or different objects are taken.

The guide-piece L or some equivalent thereof is absolutely essential, as the attempt to hold the block I by hand would shake the camera or move it from its normal position while the picture was being taken.

Heretofore I have spoken of the above contrivance as calculated to take four pictures upon the same plate. It is evident, however, that it may be so arranged as to take any desired number—as six or eight, for example—without departing from the principle of my invention. In this case, however, I use suitable, grooves, stops, or indices, by which the operator adjusts the positions of the plate, substantially on the same principle that he uses the corners of the opening K in the above-described apparatus.

It is evident that my improvement may be embodied by causing the lens of the camera to be made adjustable in different positions with respect to the plate, while the plate remains stationary, so that different portions of the plate may be brought into the field of the lens. This I have tried, but do not consider it practically so good a plan as the foregoing, as it necessitates a change of position of the camera itself or of the object.

What I claim as my invention, and desire to secure by Letters Patent, is—

Bringing the different portions of a single plate or several smaller plates successively into the field of the lens of the camera, substantially in the manner and for the purpose specified.

ALBERT S. SOUTHWORTH.

Witnesses:
A. H. BICKNELL,
J. J. HAWES.